(12) United States Patent
Qi (10) Patent No.: US 12,040,840 B2
(45) Date of Patent: Jul. 16, 2024

(54) HYBRID COHERENT OPTICAL TRANSCEIVER FOR QUANTUM AND CLASSICAL COMMUNICATION

(71) Applicant: Cisco Technology, Inc., San Jose, CA (US)

(72) Inventor: Bing Qi, Knoxville, TN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 17/896,565

(22) Filed: Aug. 26, 2022

(65) Prior Publication Data

US 2024/0072907 A1 Feb. 29, 2024

(51) Int. Cl.
*H04B 10/70* (2013.01)
*H04B 10/40* (2013.01)

(52) U.S. Cl.
CPC ............. *H04B 10/70* (2013.01); *H04B 10/40* (2013.01)

(58) Field of Classification Search
CPC ................................ H04B 10/70; H04B 10/40
USPC ........................................................ 398/135
See application file for complete search history.

(56) References Cited

U.S. PATENT DOCUMENTS

| | | | |
|---|---|---|---|
| 9,768,885 B2 | 9/2017 | Qi et al. | |
| 10,944,553 B2 | 3/2021 | Qi | |
| 11,251,947 B1 | 2/2022 | Wang et al. | |
| 2019/0199523 A1 | 6/2019 | Alleaume et al. | |
| 2019/0394030 A1* | 12/2019 | Forbes | H04L 9/0852 |
| 2020/0389299 A1* | 12/2020 | White | H04B 10/85 |
| 2022/0029729 A1* | 1/2022 | Guo | H04B 10/70 |

FOREIGN PATENT DOCUMENTS

| | | | |
|---|---|---|---|
| CN | 109586911 A | 4/2019 | |
| CN | 211352207 U | 8/2020 | |
| WO | 2020/211950 A1 | 10/2020 | |
| WO | WO-2020211950 A1 * | 10/2020 | ........... H04L 9/0852 |

OTHER PUBLICATIONS

Lodewyck, et al., "Quantum key distribution over 25 km with an all-fiber continuous-variable system," https://arxiv.org/abs/0706.4255v2, Sep. 2007, 25 pages.

Qi, et al., "Experimental study on Gaussian-modulated coherent states quantum key distribution over standard telecom fiber," http://arxiv.org/abs/0709.3666v1, Sep. 2007, 21 pages.

(Continued)

*Primary Examiner* — Dalzid E Singh
(74) *Attorney, Agent, or Firm* — Edell, Shapiro & Finnan, LLC (57) ABSTRACT

A first endpoint in a Quantum Key Distribution (QKD) system determines an operating mode for a hybrid transceiver for communicating in an optical communication session with a second endpoint. The operating mode is selected from a group containing a classical reception mode, a classical transmission mode, a quantum transmission mode, and a quantum reception mode. The first endpoint configures an input to a homodyne detector of the hybrid transceiver based on the operating mode and operates the hybrid transceiver in the operating mode for at least a portion of the optical communication session.

20 Claims, 8 Drawing Sheets

(56) References Cited

OTHER PUBLICATIONS

Jouguet, et al., "Experimental demonstration of long-distance continuous-variable quantum key distribution," https://arxiv.org/abs/1210.6216v1, Oct. 2012, 6 pages.

Ql, "Simultaneous classical communication and quantum key distribution using continuous variable," https://arxiv.org/abs/1606.02664v2, Aug. 2016, 7 pages.

Zhang, et al., "Continuous-variable QKD over 50km commercial fiber," https://arxiv.org/abs/1709.04618v2, May 2019, 19 pages.

Yu, et al., "Protocols for Packet Quantum Network Intercommunication," https://arxiv.org/abs/1903.10685v3, Sep. 2021, 8 pages.

Bennett, et al., "Quantum Cryptography: Public Key Distribution and Coin Tossing," International Conference on Computers, Systems, Signal Processing, Dec. 1984, 6 pages.

Diadamo, et al., "Packet Switching in Quantum Networks: A Path to Quantum Internet," https://arxiv.org/abs/2205.07507v1, May 2022, 14 pages.

Grosshans, et al., "Quantum key distribution using gaussian-modulated coherent states," http://arxiv.org/abs/quant-ph/0312016v1, Dec. 2003, 8 pages.

Gabriel, et al., "A generator for unique quantum random numbers based on vacuum states," Nature Photonics, Letters, Published Online Aug. 29, 2010, 5 pages.

Eriksson, et al., "Wavelength division multiplexing of continuous variable quantum key distribution and 18.3 Tbit/s data channels, " Communications Physics, Article, https://doi.org/10.1038/s42005-018-0105-5, Jan. 2019, 8 pages.

Ql, et al., "Feasibility of quantum key distribution through a dense wavelength division multiplexing network," New Journal of Physics 12, Oct. 2010, 17 pages.

Pan, et al., "Simultaneous two-way classical communication and measurement-device-independent quantum key distribution with coherent states," eprints.soton.ac.uk, Oct. 2019, 11 pages.

Ql, et al., "Generating the Local Oscillator "Locally" in Continuous-Variable Quantum Key Distribution Based on Coherent Detection," Phys. Rev. X 5, 041009, Oct. 2015, 12 pages.

* cited by examiner

HYBRID COHERENT OPTICAL TRANSCEIVER FOR QUANTUM AND CLASSICAL COMMUNICATION

TECHNICAL FIELD

The present disclosure relates to quantum computing and quantum network communication.

BACKGROUND

Quantum networking is a relatively new concept that may be used to extend the potency of quantum computing by enabling several smaller quantum computers to combine their processing power. Quantum Key Distribution (QKD) is a relatively mature quantum technology that provides a cryptographic key distribution protocol with proven security against quantum adversaries. Typical QKD implementations are purpose-built quantum communication system that are built in parallel with classical communication systems. Classical optical communication systems typically employ high intensity laser pulses, and QKD system operate at the single-photon level. Different hardware is typically used to implement the two different communication modalities

DETAILED DESCRIPTION

Overview

A method is provided to improve CV-QKD systems with the use of a hybrid transceiver. The method includes determining an operating mode for a hybrid transceiver of a first endpoint in an optical communication session with a second endpoint. The operating mode is selected from a group containing a classical reception mode, a classical transmission mode, a quantum transmission mode, and a quantum reception mode. The method further includes configuring at least one input to a homodyne detector of the hybrid transceiver based on the operating mode and operating the hybrid transceiver in the operating mode for at least a portion of the optical communication session.

Example Embodiments

Quantum Key Distribution (QKD) relies on a classical communication channel in parallel with a quantum communication channel, which typically leads to a complicated system design of separate communication systems. Providing separate quantum communication systems and classical communication systems presents a cost obstacle to widespread adoption of secure QKD deployments. The techniques described herein provide for a universal hybrid coherent optical transceiver for both quantum communication and classical communication. By implementing multiple communication protocols with a single hardware system, the hybrid transceiver improves the cost effectiveness and the flexibility of quantum/classical communication networks.

QKD allows two remote endpoints to establish a set of shared random numbers securely through an insecure quantum communication channel. The shared random numbers may provide the basis for various cryptographic protocols as a secret key to achieve long term information-theoretic security. Quantum communication systems typically employ single photon detectors for Discrete-Variable QKD (DV-QKD) or optical homodyne detectors for Continuous-Variable QKD (CV-QKD). At relatively short distances, CV-QKD protocols using optical homodyne detectors may be implemented using standard telecommunication components, such as laser sources, intensity/phase modulators, and optical coherent receivers (e.g., homodyne detectors). An optical coherent receiver may be operated at a higher speed than single photon detectors, since optical coherent receivers do not experience the dead time associated with single photon detectors. Additionally, a coherent optical receiver may effectively suppress background photons through the intrinsic filtering provided by a local oscillator. These advantages of CV-QKD enable hybrid transceivers to operate through dense wavelength division multiplexed (DWDM) fiber networks in the presence of strong classical network traffic.

One example of a CV-QKD protocol is the Gaussian Modulated Coherent States (GMCS) protocol, which has been demonstrated over single mode fiber links. Early implementations of CV-QKD sent a strong local oscillator through the quantum channel between endpoints. More recently, a pilot-aided feedforward carrier phase recovery scheme enables CV-QKD to be implemented using a true local oscillator generated at the receiver endpoint. This true local oscillator scheme removes potential side-channel attacks on the transmitted local oscillator and further reduces the gap between a CV-QKD system and a classical coherent communication system. The techniques presented herein close the gap between QKD and classical communication by providing a hybrid coherent optical transceiver, which implements reliable classical communication and secure QKD either separately or simultaneously.

Figure 1:
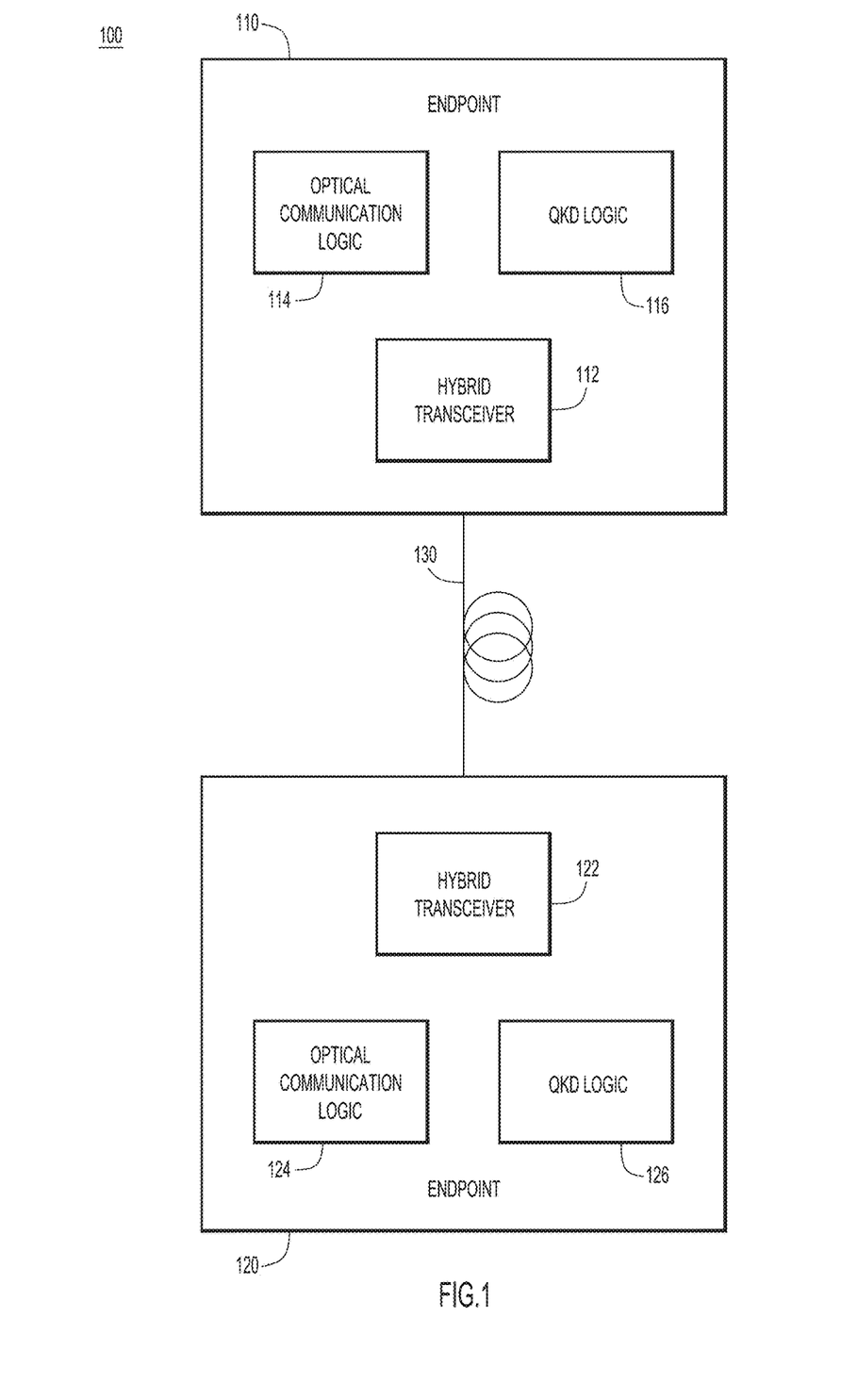
FIG. 1 is simplified block diagram of a quantum networking system between two endpoints, according to an example embodiment.

Referring now to FIG. 1, a communication system 100 is shown connecting a first endpoint 110 and a second endpoint 120 with an optical link 130. The first endpoint 110 includes a hybrid transceiver 112, optical communication logic 114, and QKD logic 116. The hybrid transceiver 112 is configured to transmit and/or receive coherent light as quantum signals or classical signals. The optical communication logic 114 enables the first endpoint 110 to process and configure data (e.g., quantum data or classical data) through the hybrid transceiver 112. The QKD logic 116 enables the first endpoint 110 to generate a set of random numbers that the second endpoint 120 can reproduce securely across an insecure optical link 130.

The second endpoint 120 includes a hybrid transceiver 122, which may be configured similarly to the hybrid transceiver 112 of the first endpoint 110. Similarly, the second endpoint 120 includes optical communication logic 124 to enable the second endpoint 120 to process and configure data (e.g., quantum data or classical data) through the hybrid transceiver 122. The second endpoint 120 also includes QKD logic 126 that enables the second endpoint 120 to generate a set of random numbers that the first endpoint 110 can reproduce securely across an insecure optical link 130.

In one example, the set of random numbers may be used by both the first endpoint 110 and the second endpoint 120 as a cryptographic key or as a seed (e.g., random bits) for one or more cryptographic keys. For instance, the secure set of random numbers may be expanded (e.g., through Advanced Encryption Standard (AES) key expansion) to generate multiple cryptographic keys. In another example, the set of random numbers may be reduced to minimize the amount of information available to eavesdroppers on the insecure optical link 130.

Figure 2:
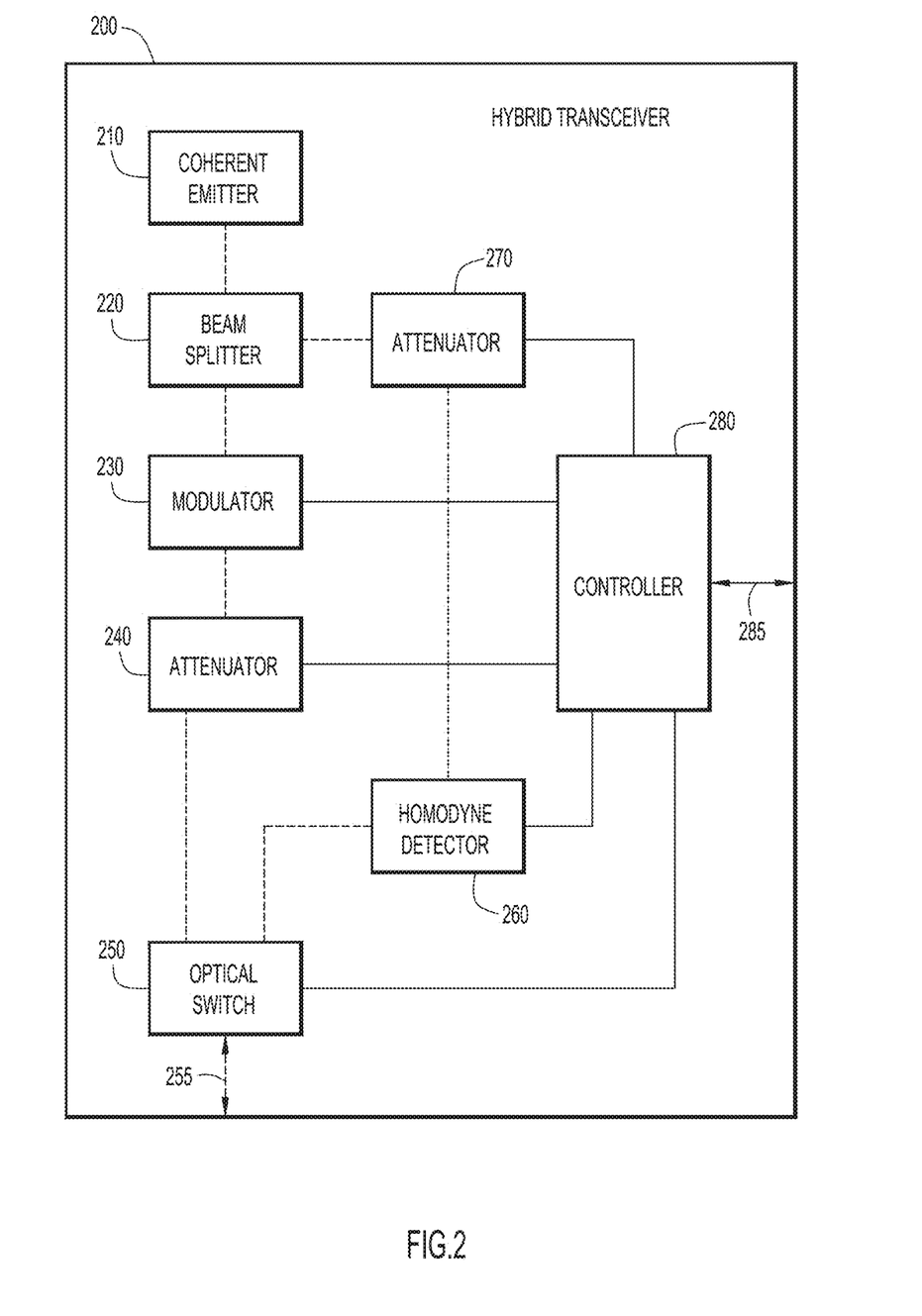
FIG. 2 is a simplified block diagram of a hybrid transceiver in an endpoint, according to an example embodiment.

Referring now to FIG. 2, an example of a hybrid transceiver 200 is shown. The hybrid transceiver 200 may describe the hybrid transceiver 112 and/or the hybrid transceiver 122 as shown in FIG. 1. FIG. 2 depicts optical connections as dashed lines and electrical connections as solid lines. However, in other examples, one or more of the electrical connections may also be implemented as optical data connections.

The hybrid transceiver 200 includes a coherent emitter 210 that is configured to produce coherent light at a predetermined frequency. In one example, the coherent emitter 210 may be a laser (e.g., diode laser, solid-state laser, etc.). The output of the coherent emitter 210 is directed to a beam splitter 220 that is configured to split the light from the coherent emitter 210 into two outputs. A first output of the beam splitter 220 is connected to the input of a modulator 230, which is configured to encode data on a light signal from the beam splitter 220.

The output of the modulator 230 is connected to the input of a first attenuator 240. In one example, the first attenuator 240 may be a variable attenuator that is configured to control the intensity of the light signal and select whether the light signal transmitted from the hybrid transceiver 200 is a quantum signal (e.g., low intensity) or a classical signal (e.g., high intensity). The output of the first attenuator 240 is connected to one input of an optical switch 250. The optical switch 250 is configured to selective connect an external channel 255 to the first attenuator 240 (e.g., for transmitting optical signals) or to a first input of a homodyne detector 260 (e.g., for processing received optical signals). In one example, the external channel 255 is connected to the optical link 130 shown in FIG. 1.

The second input of the homodyne detector 260 is connected to a second attenuator 270. A second output of the beam splitter 220 is connected to the input of the second attenuator 270. The light signal output from the second output of the beam splitter 220, which may be attenuated by the second attenuator 270, serves as a Local Oscillator (LO) for the homodyne detector 260 to recover data from received optical signals. In one example, the second attenuator 270 is configured to control the intensity of the LO signal to substantially match the intensity of incoming optical signals.

The output of the homodyne detector 260 is connected to a controller 280. The controller 280 is connected to the first attenuator 240, the second attenuator 270, and the optical switch 250 to adjust the components of the hybrid transceiver 200 based on an operating mode (e.g., quantum transmission, quantum reception, classical transmission, or classical reception). The controller 280 is also connected to the modulator 230 to enable the hybrid transceiver 200 to encode data on outgoing transmission signals. In one example, the controller 280 may include one or more individual control elements (e.g., a modulator driver, an attenuator driver, an optical switch driver) configured to control the components of the hybrid transceiver 200, such as the first attenuator 240, the second attenuator 270, the modulator 230, and/or the optical switch 250.

Additionally, the controller 280 is connected to a user interface 285 that communicates with other components of the endpoint in which the hybrid transceiver 200 is installed. For instance, the controller 280 may provide data to the processor of the endpoint through the user interface 285. Further, the controller may receive data and/or instructions from the endpoint process through the user interface 285.

Figure 3A:
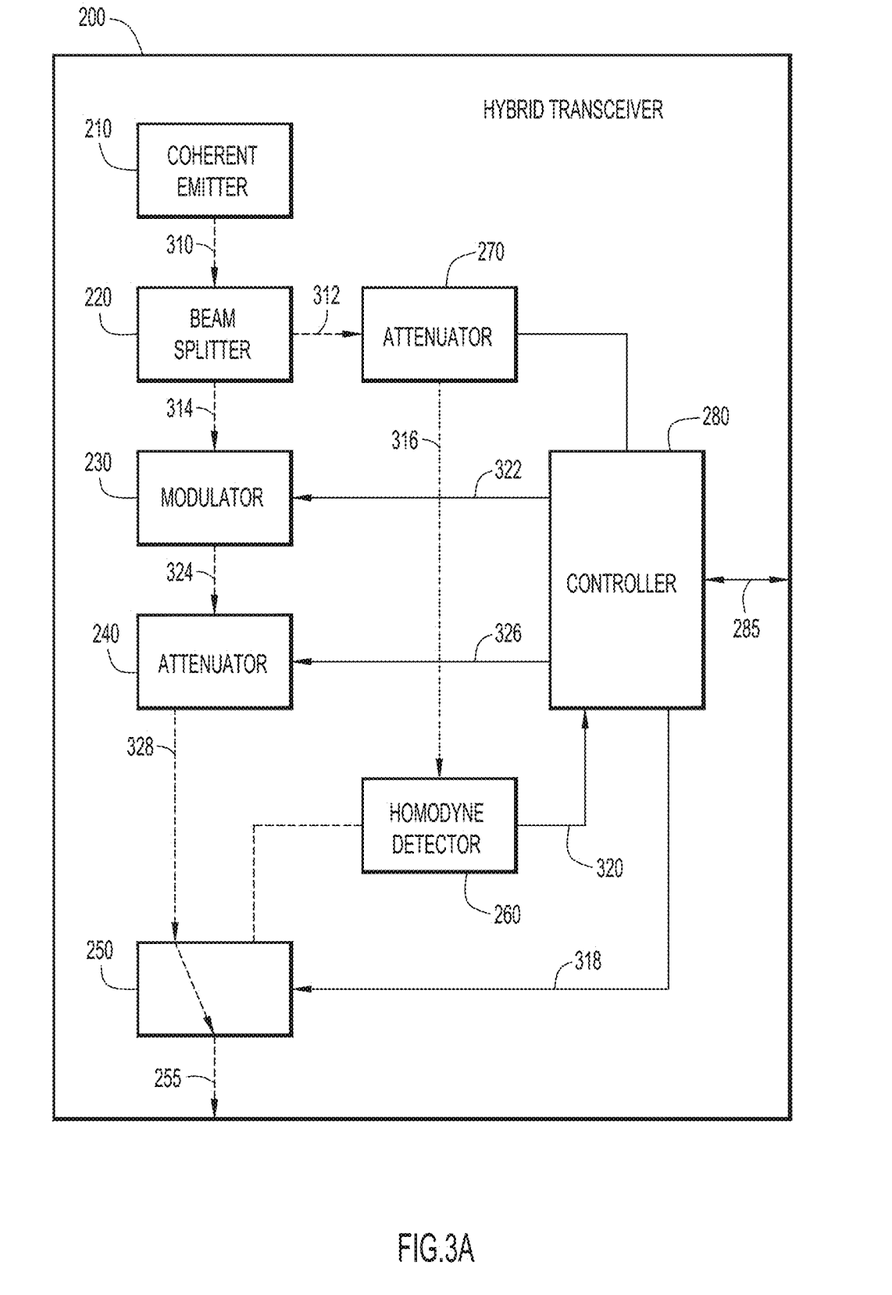
FIG. 3A illustrates a hybrid transceiver configured for QKD transmission, according to an example embodiment.

Referring now to FIG. 3A, an example of the hybrid transceiver 200 configured in a quantum transmission mode, specifically a QKD mode, is shown. In the quantum transmission mode, the coherent emitter 210 produces a light signal 310 that is divided by the beam splitter 220 into a light signal 312 and a light signal 314. The light signal 312 is directed to the second attenuator 270, where the intensity of the light signal 312 may be attenuated to produce a light signal which is used as a LO signal 316. Alternatively, the second attenuator 270 may produce the LO signal 316 without significant attenuation.

To generate a truly random number for QKD with a counterpart endpoint, the hybrid transceiver 200 provides a LO signal 316 to one input of the homodyne detector 260. The controller 280 provides an instruction 318 to the optical switch 250 configuring the optical switch 250 for transmission, which disconnects the second input of the homodyne detector 260 from any meaningful optical signal. In other words, the homodyne detector 260 is configured to measure the electric field of a vacuum state with a LO signal 316, which results in a random signal. The output 320 of the homodyne detector 260 is provided to the controller 280, which may perform digitalization, randomness extraction or other operations to generate a set of truly random numbers.

The controller 280 may store the set of random numbers in a local memory (e.g., via the user interface 285) as raw keys. The controller 280 also sends instructions 322 to the modulator 230 and encode the set of random numbers on the light signal 314 from the beam splitter 220. The modulator 230 provides the encoded signal 324 to the first attenuator 240. In one example, the encoded signal 324 may be constructed using intensity and phase modulators in the modulator 230.

The controller 280 provides instructions 326 to the first attenuator 240 to lower the intensity of the encoded signal 324 to a quantum level. The first attenuator 240 provides the encoded quantum signal 328 to the optical switch 250. Based on the instructions 318 from the controller 280, the optical switch 250 routes the encoded quantum signal 328 to the external channel 255.

In one example, the controller 280 may removing the LO signal 316 from the input of the homodyne detector 260 to measure the electrical noise of the homodyne detector 260. The controller 280 may use the measure of electrical noise to quantify the quantum entropy for random number generation.

Figure 3B:
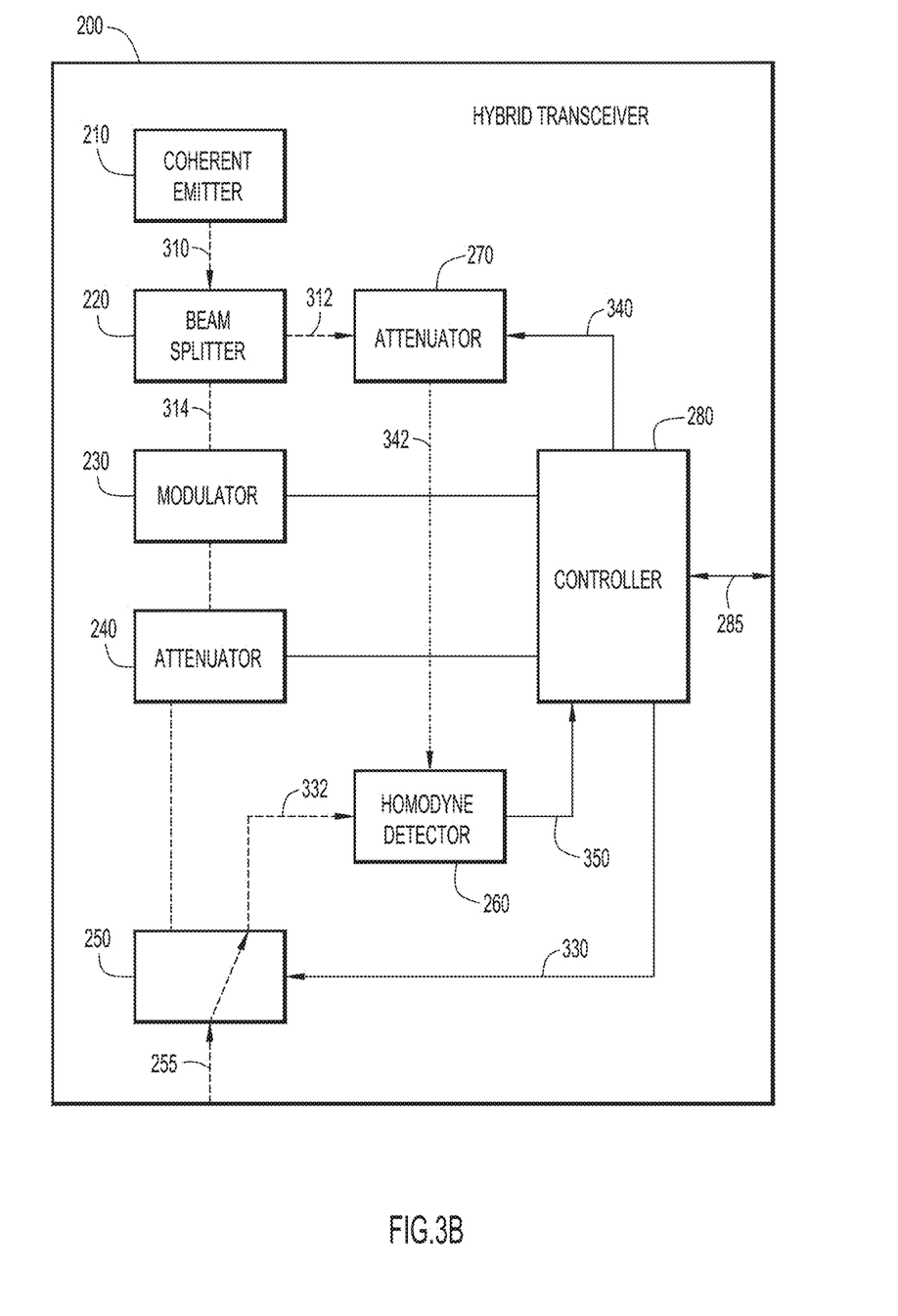
FIG. 3B illustrates a hybrid transceiver configured for QKD reception, according to an example embodiment.

Referring now to FIG. 3B, an example of the hybrid transceiver 200 configured in a quantum reception mode is shown. In the quantum reception mode, the controller 280 provides an instruction 330 to the optical switch 250 to couple the external channel 255 with one input of the homodyne detector 260. A received quantum signal 332 is provided to the homodyne detector for coherent detection.

The coherent emitter 210 provides the light signal 310 to the beam splitter 220, which provides light signal 312 to the second attenuator 270. The controller 280 provides an instruction 340 to the second attenuator 270 to reduce the intensity of the light signal 312 to generate a LO signal 342 with an appropriate intensity for the received quantum signal 332.

The homodyne detector 260 measures the received quantum signal 332 with the LO signal 342 and provides the output 350 to the controller 280. The controller 280 may perform digitalization or other operations to store the measurement results in a local memory (e.g., via the user interface 285) as raw keys.

In one example, the detector noise and shot noise may be calibrated by conducting two measurements. In a first measurement at a randomly chosen time, the controller 280 may instruct the optical switch 250 to block the received quantum signal 332, instruct the second attenuator 270 to keep the LO signal 342 at the normal intensity, and read the output 350 of the homodyne detector 260. In a second measurement at a different randomly chosen time, the controller 280 may instruct the optical switch 250 to block the received quantum signal 332, instruct the second attenuator 270 to reduce the LO signal 342 to the minimum intensity possible, and read the output 350 of the homodyne detector 260. This calibration process enables the controller 280 to properly quantify the noise introduced by an adversary in an attack, which is an indication of the amount of information leaked to the adversary.

Figure 3C:
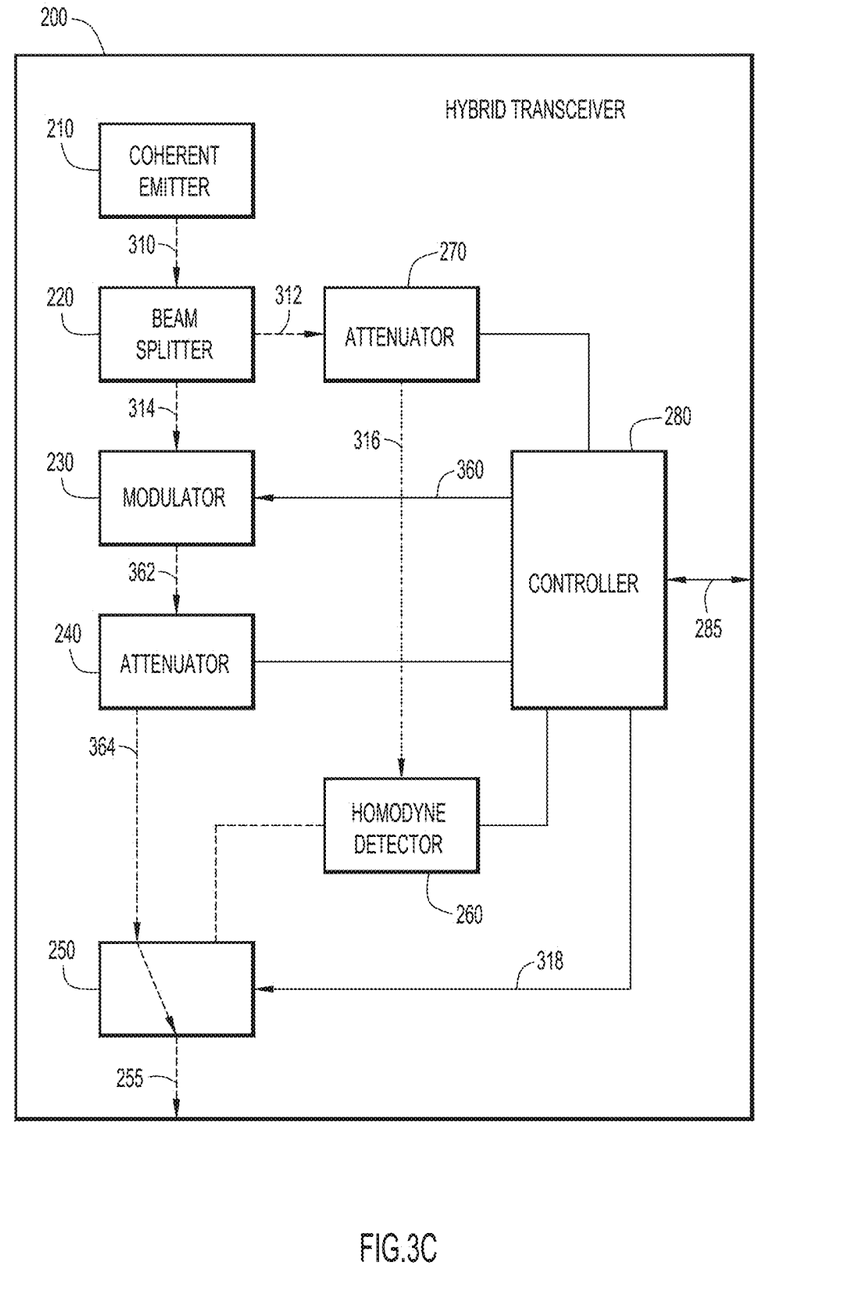
FIG. 3C illustrates a hybrid transceiver configured for classical optical transmission, according to an example embodiment.

Referring now to FIG. 3C, an example of the hybrid transceiver 200 configured in a classical transmission mode is shown. As in the quantum transmission mode described with respect to FIG. 3A, the coherent emitter 210 provides a light signal 310 to a beam splitter 220. The beam splitter 220 divides the light signal 310 into a light signal 312 (e.g., as the basis for a LO signal) and light signal 314. If the classical transmission does not require a random number generator (e.g., the cryptographic seeds have already been generated or the classical data is not encrypted), then the light signal 312 is not required to propagate beyond the second attenuator 270.

The light signal 314 is provided form the beam splitter 220 to the modulator 230. The controller 280 obtains data to encode in the classical communication (e.g., from the user interface 285) and provides instructions 360 to the modulator 230, enabling the modulator 230 to generate the encoded light signal 362. The encoded light signal 362 is provided to the first attenuator 240, which provides the encoded light signal 364 to the optical switch 250. In one example, the first attenuator 240 does not significantly alter the intensity of the encoded light signal 362 to generate the encoded light signal 364, allowing the encoded light signal 364 to remain in the classical realm.

In the classical transmission mode, similar to the quantum transmission mode, the controller 280 provides instructions 318 to the optical switch to route the encoded light signal 364 to the external channel 255. In one example, the external channel 255 is connected to an optical link connected to a remote endpoint (e.g., optical link 130 connected to the second endpoint 120, as described with respect to FIG. 1).

Figure 3D:
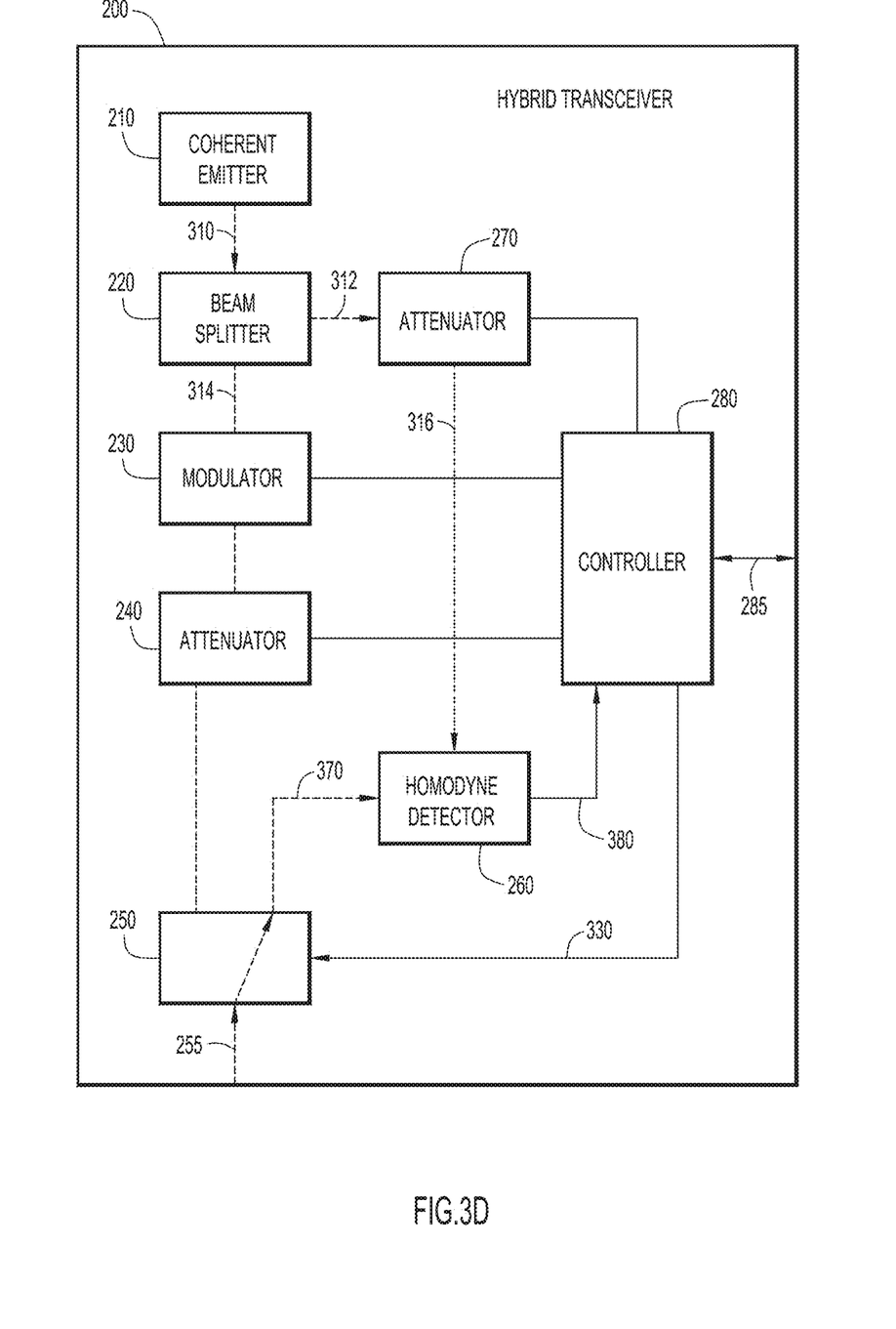
FIG. 3D illustrates a hybrid transceiver configured for classical optical reception, according to an example embodiment.

Referring now to FIG. 3D, an example of the hybrid transceiver 200 configured in a classical reception mode is shown. As in the quantum reception mode described with respect to FIG. 3B, the coherent emitter 210 provides a light signal 310 to a beam splitter 220, which splits the light signal 310 into a light signal 312 and a light signal 314. The light signal 314 is directed to the modulator 230, and may be ignored while the hybrid transceiver is in the reception mode. The beam splitter 220 provides the light signal 312 to the second attenuator 270 as the basis for a LO signal 316 that is provided to one input of the homodyne detector 260. In one example, the controller 280 may direct the second attenuator 270 to reduce the intensity of the LO signal 316 to substantially match the intensity of a received classical signal 370.

As described with respect to the quantum reception mode of FIG. 3B, the controller 280 provides an instruction 330 to the optical switch to route the received classical signal 370 to the other input of the homodyne detector 260. The homodyne detector 260 measures the received classical signal 370 with the LO signal 316 and provides the output 380 to the controller 280. The controller 280 may perform digitalization or other operations on the output 380 to recover encoded classical data. The controller 280 may provide the received classical data to other elements of the endpoint though the user interface 285.

Referring now to FIGS. 3A-3D, the techniques presented herein may also provide for switching between quantum communication and classical communication through the control signals provided by the controller 280. For instance, the controller 280 may transition between classical transmission and quantum transmission modes through the level of attenuation of the first attenuator 240. Similarly, the controller may transition between classical reception and quantum reception modes through the level of attenuation of the second attenuator 270. Additionally, the controller may transition between classical/quantum transmission and classical/quantum reception modes through the control signal provided to the optical switch 250.

Figure 4:
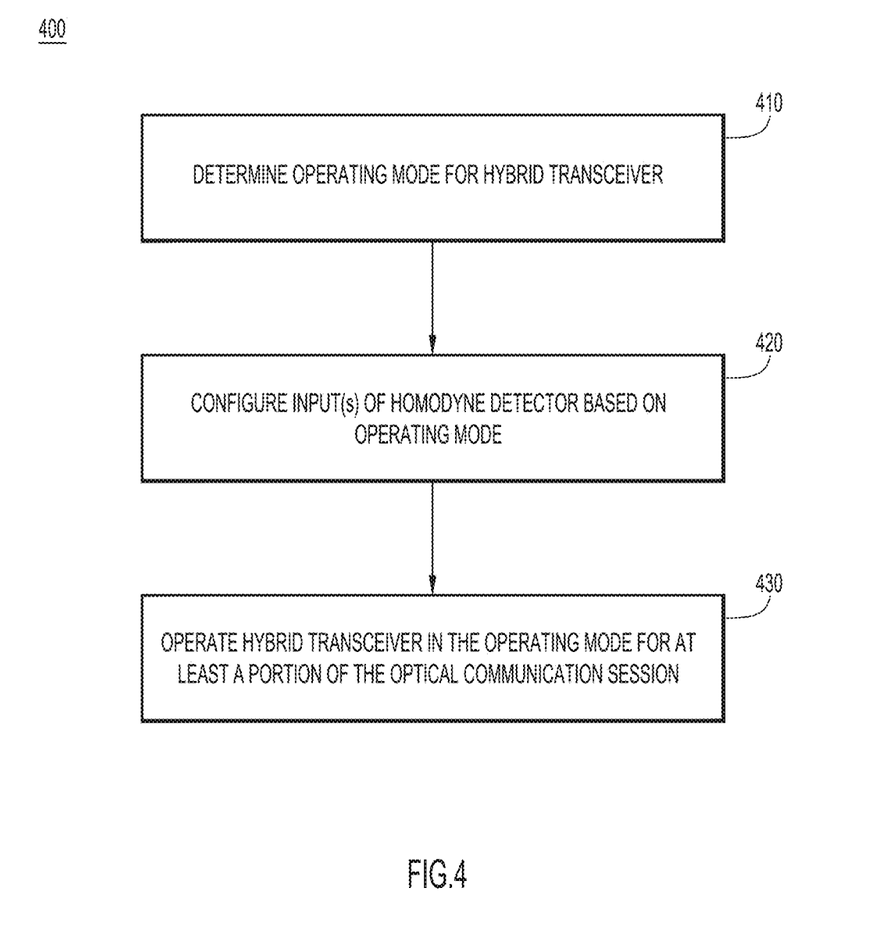
FIG. 4 is a flowchart illustrating operations performed by an endpoint to operate a hybrid transceiver in a selected operating mode, according to an example embodiment.

Referring now to FIG. 4, a flowchart illustrates an example process 400 performed by a first endpoint (e.g., first endpoint 110) to operate a hybrid transceiver (e.g., hybrid transceiver 112) according to a selected operating mode. At 410, the first endpoint determines an operating mode for the hybrid transceiver in an optical communication session with a second endpoint. The operating mode may be a classical reception mode, a classical transmission mode, a quantum transmission mode, or a quantum reception mode. In one example, the optical communication session is associated with a QKD system for securely generating cryptographic keys.

At 420, the first endpoint configures at least one input to a homodyne detector of the hybrid transceiver based on the operating mode. In one example, the first endpoint may configure the LO signal provided to the homodyne detector. In another example, the first endpoint may configure at least one input to the homodyne detector to be disconnected from any signal to generate a measurably random signal as the source for a set of random numbers.

At 430, the first endpoint operates the hybrid transceiver in the operating mode for at least a portion of the optical communication session. In one example, the first endpoint may operate the hybrid transceiver in different modes during the optical communication session. For instance, the hybrid transceiver may begin in a quantum transmission mode to transmit a quantum signal encoded with a random set of numbers. Following the transmission of the quantum signal encoded with the random set of numbers, the hybrid transceiver may transition to classical transmission/reception modes to communicate measurement data related to the set of random numbers.

Figure 5:
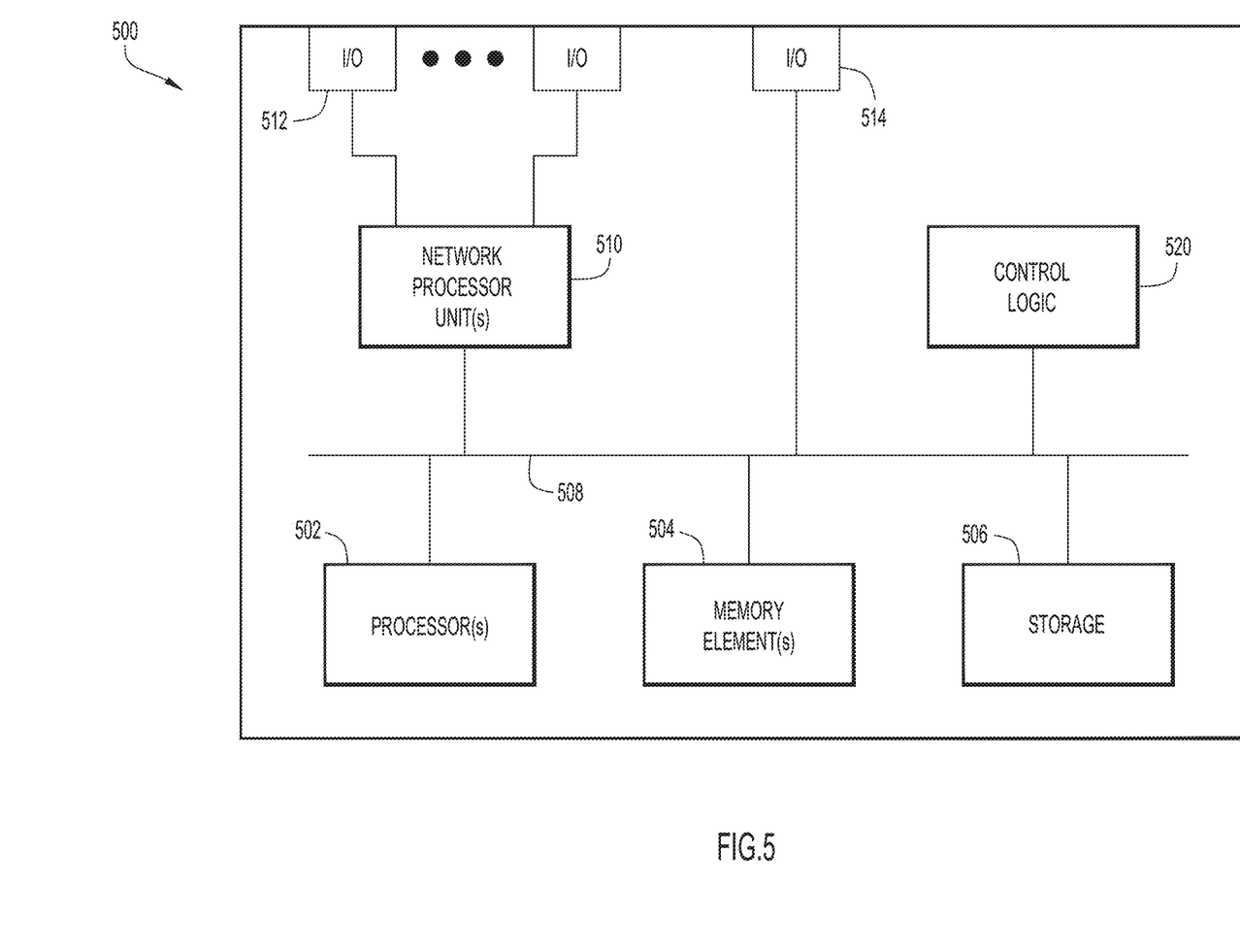
FIG. 5 is a block diagram of a computing device that may be configured to perform the techniques presented herein, according to an example embodiment.

Referring to FIG. 5, FIG. 5 illustrates a hardware block diagram of a computing device 500 that may perform functions associated with operations discussed herein in connection with the techniques depicted in FIGS. 1, 2, 3A-3D, and 4. In various embodiments, a computing device, such as computing device 500 or any combination of computing devices 500, may be configured as any entity/entities as discussed for the techniques depicted in connection with FIGS. 1, 2, 3A-3D, and 4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information, classical bits, qubits) from one state or thing to another state or thing. Any of potential classical processing elements, quantum processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store quantum data, classical data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a classical network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store classical data/information or quantum data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), light quantum memory, solid quantum memory, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store classical data, quantum data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, the techniques presented herein provide for a universal hybrid coherent optical transceiver usable for both reliable classical communication and information-theoretically secure QKD. Unlike existing CV-QKD designs in which one endpoint holds a quantum transmitter and the other endpoint holds a quantum receiver, the universal hybrid coherent optical transceiver functions as both a transmitter and receiver for either or both endpoints. Through the use of the hybrid transceivers described herein, any pair of endpoints in a QKD network may establish secure communication keys. Additionally, the hybrid transceiver is reconfigurable to accommodate both strong classical communication signals and weak QKD signals. Further, when operating as a QKD transmitter, the optical homodyne detector of the hybrid transceiver may function as a quantum random number generator to generate truly random numbers from vacuum noise.

In some aspects, the techniques described herein relate to a method including: determining an operating mode for a hybrid transceiver of a first endpoint in an optical communication session with a second endpoint, the operating mode being selected from a group containing a classical reception mode, a classical transmission mode, a quantum transmission mode, and a quantum reception mode; configuring at least one input to a homodyne detector of the hybrid transceiver based on the operating mode; and operating the hybrid transceiver in the operating mode for at least a portion of the optical communication session.

In some aspects, the techniques described herein relate to a method, wherein responsive to a determination that the operating mode is the quantum transmission mode, configuring the at least one input of the homodyne detector includes configuring the homodyne detector to measure a vacuum state with a local oscillator.

In some aspects, the techniques described herein relate to a method, further including: obtaining random bits for a quantum key distribution system from an output of the homodyne detector; encoding the random bits for the quantum key distribution system as a quantum signal; and transmitting the quantum signal from the hybrid transceiver to the second endpoint in the optical communication session.

In some aspects, the techniques described herein relate to a method, further including: changing the operating mode to the classical reception mode, enabling the first endpoint to receive a classical data signal; configuring the homodyne detector to measure the classical data signal with the local oscillator; and recovering an encoded classical signal from the output of the homodyne detector.

In some aspects, the techniques described herein relate to a method, further including: calibrating noise in the homodyne detector by blocking one or two inputs of the homodyne detector.

In some aspects, the techniques described herein relate to a method, wherein responsive to a determination that the operating mode is the quantum reception mode or the classical reception mode, configuring the at least one input of the homodyne detector includes configuring the homodyne detector to measure a received signal with a local oscillator.

In some aspects, the techniques described herein relate to a method, further including adjusting an intensity of the local oscillator that is input to the homodyne detector based on whether the operating mode is the quantum reception mode or the classical reception mode.

In some aspects, the techniques described herein relate to an apparatus including: an optical transmitter configured to produce a coherent optical signal; a modulator configured to encode data on the coherent optical signal; an optical switch; a homodyne detector configured to measure a received signal from the optical switch with a local oscillator obtained from the coherent optical signal; and a processor coupled to the modulator, the optical switch, and the homodyne detector, the processor configured to: determine an operating mode for the apparatus in an optical communication session with a remote endpoint, the operating mode being selected from a group containing a classical reception mode, a classical transmission mode, a quantum transmission mode, and a quantum reception mode; adjust at least one input to the homodyne detector based on the operating mode; and operate the apparatus in the operating mode for at least a portion of the optical communication session.

In some aspects, the techniques described herein relate to an apparatus, wherein responsive to a determination that the operating mode is the quantum transmission mode, the processor is further configured to adjust the at least one input of the homodyne detector by attenuating the received signal from the optical switch, enabling the homodyne detector to measure a vacuum state with the local oscillator.

In some aspects, the techniques described herein relate to an apparatus, wherein the processor is further configured to: obtain random bits for a quantum key distribution system from an output of the homodyne detector; cause the modulator to encode the random bits for the quantum key distribution system as a quantum signal on the coherent optical signal; and cause the optical switch to transmit the quantum signal to the remote endpoint in the optical communication session.

In some aspects, the techniques described herein relate to an apparatus, wherein the processor is further configured to: change the operating mode to the classical reception mode, enabling the optical switch to receive a classical data signal; adjust the homodyne detector to measure the classical data signal with the local oscillator; and recover an encoded classical signal from the output of the homodyne detector.

In some aspects, the techniques described herein relate to an apparatus, further including a first variable attenuator configured to adjust an intensity of the coherent optical signal to be used as the local oscillator, wherein the processor is further configured to perform a noise calibration of the homodyne detector by blocking one or two inputs of the homodyne detector.

In some aspects, the techniques described herein relate to an apparatus, wherein responsive to a determination that the operating mode is the quantum reception mode or the classical reception mode, the processor is further configured to adjust the optical switch to provide the received signal to the at least one input of the homodyne detector, enabling the homodyne detector to measure the received signal with the local oscillator.

In some aspects, the techniques described herein relate to an apparatus, wherein the processor is further configured to cause a first variable attenuator to adjust an intensity of the local oscillator that is input to the homodyne detector based on whether the operating mode is the quantum reception mode or the classical reception mode.

In some aspects, the techniques described herein relate to one or more non-transitory computer readable storage media encoded with software including computer executable instructions that, when the software is executed on a first endpoint with a hybrid transceiver, is operable to cause a processor of the first endpoint to: determine an operating mode for the hybrid transceiver of the first endpoint in an optical communication session with a second endpoint, the operating mode being selected from a group containing a classical reception mode, a classical transmission mode, a quantum transmission mode, and a quantum reception mode; configure at least one input to a homodyne detector of the hybrid transceiver based on the operating mode; and operate the hybrid transceiver in the operating mode for at least a portion of the optical communication session.

In some aspects, the techniques described herein relate to one or more non-transitory computer readable storage media, wherein responsive to a determination that the operating mode is the quantum transmission mode, the software is further operable to cause the processor to configure the at least one input of the homodyne detector by configuring the homodyne detector to measure a vacuum state with a local oscillator.

In some aspects, the techniques described herein relate to one or more non-transitory computer readable storage media, wherein the software is further operable to cause the processor to: obtain random bits for a quantum key distribution system from an output of the homodyne detector; encode the random bits for the quantum key distribution system as a quantum signal; and transmit the quantum signal from the hybrid transceiver to the second endpoint in the optical communication session.

In some aspects, the techniques described herein relate to one or more non-transitory computer readable storage media, wherein the software is further operable to cause the processor to: change the operating mode to the classical reception mode, enabling the first endpoint to receive a classical data signal related to the quantum key distribution system from the second endpoint; configure the homodyne detector to measure the classical data signal with the local oscillator; and recover an encoded classical signal from the output of the homodyne detector.

In some aspects, the techniques described herein relate to one or more non-transitory computer readable storage media, wherein the software is further operable to cause the processor to: block one or two inputs of the homodyne detector; and perform a noise calibration of the homodyne detector.

In some aspects, the techniques described herein relate to one or more non-transitory computer readable storage media, wherein the software is further operable to cause the processor to adjust an intensity of a local oscillator that is input to the homodyne detector based on whether the operating mode is the quantum reception mode or the classical reception mode.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
determining an operating mode for a hybrid transceiver of a first endpoint in an optical communication session with a second endpoint, the operating mode being selected from a group containing a classical reception mode, a classical transmission mode, a quantum transmission mode, and a quantum reception mode;
configuring at least one input to a homodyne detector of the hybrid transceiver based on the operating mode, wherein responsive to a determination that the operating mode is the quantum transmission mode, configuring the at least one input of the homodyne detector comprises configuring the homodyne detector to measure a vacuum state with a local oscillator; and
operating the hybrid transceiver in the operating mode for at least a portion of the optical communication session.

2. The method of claim 1, further comprising:
obtaining random bits for a quantum key distribution system from an output of the homodyne detector;
encoding the random bits for the quantum key distribution system as a quantum signal; and
transmitting the quantum signal from the hybrid transceiver to the second endpoint in the optical communication session.

3. The method of claim 2, further comprising:
changing the operating mode to the classical reception mode, enabling the first endpoint to receive a classical data signal;
configuring the homodyne detector to measure the classical data signal with the local oscillator; and
recovering an encoded classical signal from the output of the homodyne detector.

4. The method of claim 1, further comprising:
calibrating noise in the homodyne detector by blocking one or two inputs of the homodyne detector.

5. The method of claim 4, wherein an input of one or two inputs of the homodyne detector that are blocked is a quantum signal received by the homodyne detector.

6. The method of claim 1, wherein responsive to a determination that the operating mode is the quantum reception mode or the classical reception mode, configuring the at least one input of the homodyne detector comprises configuring the homodyne detector to measure a received signal with the local oscillator.

7. The method of claim 6, further comprising adjusting an intensity of the local oscillator that is input to the homodyne detector based on whether the operating mode is the quantum reception mode or the classical reception mode.

8. An apparatus comprising:
   an optical transmitter configured to produce a coherent optical signal;
   a modulator configured to encode data on the coherent optical signal;
   an optical switch;
   a homodyne detector configured to measure a received signal from the optical switch with a local oscillator obtained from the coherent optical signal; and
   a processor coupled to the modulator, the optical switch, and the homodyne detector, the processor configured to:
      determine an operating mode for the apparatus in an optical communication session with a remote endpoint, the operating mode being selected from a group containing a classical reception mode, a classical transmission mode, a quantum transmission mode, and a quantum reception mode;
      adjust at least one input to the homodyne detector based on the operating mode wherein responsive to a determination that the operating mode is the quantum transmission mode, the processor is to adjust the at least one input of the homodyne detector by attenuating the received signal from the optical switch to enable the homodyne detector to measure a vacuum state with the local oscillator; and
      operate the apparatus in the operating mode for at least a portion of the optical communication session.

9. The apparatus of claim 8, wherein the processor is further configured to:
   obtain random bits for a quantum key distribution system from an output of the homodyne detector;
   cause the modulator to encode random bits for the quantum key distribution system as a quantum signal on the coherent optical signal; and
   cause the optical switch to transmit the quantum signal to the remote endpoint in the optical communication session.

10. The apparatus of claim 9, wherein the processor is further configured to:
    change the operating mode to the classical reception mode, enabling the optical switch to receive a classical data signal;
    adjust the homodyne detector to measure the classical data signal with the local oscillator; and
    recover an encoded classical signal from the output of the homodyne detector.

11. The apparatus of claim 8, further comprising a first variable attenuator configured to adjust an intensity of the coherent optical signal to be used as the local oscillator, wherein the processor is further configured to perform a noise calibration of the homodyne detector by blocking one or two inputs of the homodyne detector.

12. The apparatus of claim 8, wherein responsive to a determination that the operating mode is the quantum reception mode or the classical reception mode, the processor is further configured to adjust the optical switch to provide the received signal to the at least one input of the homodyne detector to enable the homodyne detector to measure the received signal with the local oscillator.

13. The apparatus of claim 12, wherein the processor is further configured to cause a first variable attenuator to adjust an intensity of the local oscillator that is input to the homodyne detector based on whether the operating mode is the quantum reception mode or the classical reception mode.

14. The apparatus of claim 8, wherein an input of one or two inputs of the homodyne detector that are blocked is a quantum signal received by the homodyne detector.

15. One or more non-transitory computer readable storage media encoded with software comprising computer executable instructions that, when the software is executed on a first endpoint with a hybrid transceiver, is operable to cause a processor of the first endpoint to:
    determine an operating mode for the hybrid transceiver of the first endpoint in an optical communication session with a second endpoint, the operating mode being selected from a group containing a classical reception mode, a classical transmission mode, a quantum transmission mode, and a quantum reception mode;
    configure at least one input to a homodyne detector of the hybrid transceiver based on the operating mode, wherein responsive to a determination that the operating mode is the quantum transmission mode, the software is to cause the processor to configure the at least one input of the homodyne detector to configure the homodyne detector to measure a vacuum state with a local oscillator; and
    operate the hybrid transceiver in the operating mode for at least a portion of the optical communication session.

16. The one or more non-transitory computer readable storage media of claim 15, wherein the software is further operable to cause the processor to:
    obtain random bits for a quantum key distribution system from an output of the homodyne detector;
    encode the random bits for the quantum key distribution system as a quantum signal; and
    transmit the quantum signal from the hybrid transceiver to the second endpoint in the optical communication session.

17. The one or more non-transitory computer readable storage media of claim 16, wherein the software is further operable to cause the processor to:
    change the operating mode to the classical reception mode, enabling the first endpoint to receive a classical data signal related to the quantum key distribution system from the second endpoint;
    configure the homodyne detector to measure the classical data signal with the local oscillator; and
    recover an encoded classical signal from the output of the homodyne detector.

18. The one or more non-transitory computer readable storage media of claim 15, wherein the software is further operable to cause the processor to:
    block one or two inputs of the homodyne detector; and
    perform a noise calibration of the homodyne detector.

19. The one or more non-transitory computer readable storage media of claim 15, wherein responsive to a determination that the operating mode is the quantum reception mode or the classical reception mode, the software is further operable to cause the processor to configure the at least one input of the homodyne detector comprises configuring the homodyne detector to measure a received signal with the local oscillator.

20. The one or more non-transitory computer readable storage media of claim 15, wherein the software is further operable to adjust an intensity of the local oscillator that is input to the homodyne detector based on whether the operating mode is the quantum reception mode or the classical reception mode.

* * * * *

UNITED STATES PATENT AND TRADEMARK OFFICE
CERTIFICATE OF CORRECTION

PATENT NO. : 12,040,840 B2
APPLICATION NO. : 17/896565
DATED : July 16, 2024
INVENTOR(S) : Bing Qi Page 1 of 1

It is certified that error appears in the above-identified patent and that said Letters Patent is hereby corrected as shown below:

In the Claims

Claim 8, Column 15, Line 24, please replace "on the operating mode wherein responsive to" with --on the operating mode, wherein responsive to--

Signed and Sealed this
Twenty-sixth Day of November, 2024

Katherine Kelly Vidal
*Director of the United States Patent and Trademark Office*